(12) United States Patent
Carmein et al.

(10) Patent No.: US 9,194,368 B2
(45) Date of Patent: Nov. 24, 2015

(54) SYSTEM AND METHOD FOR CONTROLLING ELECTRIC FIELDS IN ELECTRO-HYDRODYNAMIC APPLICATIONS

(75) Inventors: David Carmein, Ann Arbor, MI (US);
Dawn White, Ann Arbor, MI (US);
Randy C. Stevenson, Saline, MI (US)

(73) Assignee: Accio Energy, Inc., Ann Arbor, MI (US)

( * ) Notice: Subject to any disclaimer, the term of this patent is extended or adjusted under 35 U.S.C. 154(b) by 945 days.

(21) Appl. No.: 13/276,055

(22) Filed: Oct. 18, 2011

(65) Prior Publication Data

US 2012/0211989 A1 Aug. 23, 2012

Related U.S. Application Data

(60) Provisional application No. 61/528,440, filed on Aug. 29, 2011, provisional application No. 61/394,298, filed on Oct. 18, 2010.

(51) Int. Cl.
*G01N 21/85* (2006.01)
*F03D 7/00* (2006.01)
(Continued)

(52) U.S. Cl.
CPC . *F03D 7/00* (2013.01); *F03B 13/00* (2013.01); *H02N 3/00* (2013.01)

(58) Field of Classification Search
CPC .............. F03D 7/00; F03B 13/00; H02N 3/00
USPC ................. 250/573; 290/43, 54; 310/308, 314
See application file for complete search history.

(56) References Cited

U.S. PATENT DOCUMENTS 414,943 A 11/1889 Dewey
911,260 A 2/1909 Pennock
(Continued)

FOREIGN PATENT DOCUMENTS

DE 639000 11/1936
DE 19629417 A 2/1998
(Continued)

OTHER PUBLICATIONS

D. Djairam "The Electrostatic Wind Energy Converter, Electrical Performance of a High Voltage Prototype", pp. 1-173. Doctoral Dissertation, Dec. 10, 2008. http:/ /repository.tudelft.nl/view/ir/uuid:e1cfdada-85ea-45c4-b6e4-b798abf5917 e/.
(Continued)

*Primary Examiner* — Georgia Y Epps
*Assistant Examiner* — Kevin Wyatt
(74) *Attorney, Agent, or Firm* — Jeffrey Schox; Diana Lin

(57) ABSTRACT

An electro-hydrodynamic system that extracts energy from a gas stream, which includes an injector that injects a first species of particles having the same polarity into the gas stream, wherein particle movement with the gas stream is opposed by a first electric field; an electric field generator that generates a second electric field opposing the first, such that the net electric field at a predetermined distance downstream from the injector is approximately zero; an upstream collector that collects a second species of particles having a polarity opposite the first particle species; a downstream collector that collects the charged particle; and a load coupled between the downstream collector and the upstream collector, wherein the load converts the kinetic energy of the gas stream into electric power.

15 Claims, 5 Drawing Sheets

(51) Int. Cl.
    *F03B 13/00*    (2006.01)
    *H02N 3/00*    (2006.01)

(56)            References Cited

U.S. PATENT DOCUMENTS

| | | | |
|---|---|---|---|
| 1,014,719 | A | 1/1912 | Pennock |
| 2,638,555 | A | 5/1953 | Marks |
| 3,121,196 | A | 2/1964 | Kasemir |
| 3,138,919 | A * | 6/1964 | Deutsch .......................... 60/202 |
| 3,191,077 | A * | 6/1965 | Marks et al. ................. 310/308 |
| 3,309,546 | A * | 3/1967 | Boll ................................ 310/11 |
| 3,411,025 | A | 11/1968 | Marks |
| 3,489,669 | A | 1/1970 | Ruhnke |
| 3,518,461 | A | 6/1970 | Marks |
| 3,792,293 | A | 2/1974 | Marks |
| 3,960,505 | A | 6/1976 | Marks |
| 4,073,516 | A | 2/1978 | Kling |
| 4,146,371 | A | 3/1979 | Melcher et al. |
| 4,146,800 | A | 3/1979 | Gregory et al. |
| 4,204,844 | A | 5/1980 | Pilat |
| 4,206,396 | A | 6/1980 | Marks |
| 4,271,357 | A | 6/1981 | Bradshaw et al. |
| 4,328,436 | A * | 5/1982 | Biblarz et al. ................. 310/11 |
| 4,395,648 | A | 7/1983 | Marks |
| 4,417,293 | A | 11/1983 | Larigaldie |
| 4,433,248 | A | 2/1984 | Marks |
| 4,450,364 | A | 5/1984 | Benoit |
| 4,486,669 | A | 12/1984 | Pugh |
| 4,523,112 | A | 6/1985 | Marks |
| 4,581,675 | A | 4/1986 | Kelly |
| 4,667,100 | A | 5/1987 | Lagna |
| 5,047,892 | A | 9/1991 | Sakata et al. |
| 5,125,230 | A | 6/1992 | Leonard |
| 5,214,386 | A | 5/1993 | Singer et al. |
| 5,273,838 | A | 12/1993 | Draper et al. |
| 5,912,396 | A | 6/1999 | Wong |
| 6,254,034 | B1 | 7/2001 | Carpenter |
| 6,302,331 | B1 * | 10/2001 | Dvorsky et al. ................. 239/3 |
| 6,440,600 | B1 | 8/2002 | Starzak |
| 6,452,499 | B1 | 9/2002 | Runge et al. |
| 6,462,337 | B1 | 10/2002 | Li et al. |
| 6,504,702 | B1 | 1/2003 | Noll |
| 6,544,484 | B1 | 4/2003 | Kaufman et al. |
| 7,405,672 | B2 | 7/2008 | Taylor et al. |
| 7,478,712 | B2 | 1/2009 | Mccowen |
| 7,855,476 | B2 | 12/2010 | Ogram |
| 8,102,082 | B2 | 1/2012 | Ogram |
| 8,283,811 | B2 | 10/2012 | Ogram |
| 2002/0060631 | A1 | 5/2002 | Runge et al. |
| 2002/0153006 | A1 | 10/2002 | Zimlich et al. |
| 2003/0218855 | A1 | 11/2003 | Goldenberg |
| 2004/0089156 | A1 | 5/2004 | Gartstein et al. |
| 2004/0129931 | A1 | 7/2004 | Asryan et al. |
| 2004/0134997 | A1 | 7/2004 | Khain et al. |
| 2004/0164241 | A1 | 8/2004 | Farnsworth et al. |
| 2004/0179322 | A1 | 9/2004 | Pletcher et al. |
| 2006/0061107 | A1 | 3/2006 | Cadaret |
| 2007/0114381 | A1 | 5/2007 | Jackson |
| 2007/0216316 | A1 | 9/2007 | Hirano et al. |
| 2008/0063577 | A1 | 3/2008 | Crowe et al. |
| 2008/0073530 | A1 | 3/2008 | Jolliffe et al. |
| 2008/0199195 | A1 | 8/2008 | Swift et al. |
| 2008/0308095 | A1 | 12/2008 | Trees et al. |
| 2008/0309087 | A1 | 12/2008 | Evulet et al. |
| 2009/0218910 | A1 | 9/2009 | Carmein et al. |
| 2009/0314850 | A1 | 12/2009 | Kampmeyer |
| 2010/0018850 | A1 | 1/2010 | Adhvaryu et al. |
| 2010/0127624 | A1 | 5/2010 | Roy |
| 2010/0156444 | A1 | 6/2010 | Ponjee et al. |
| 2011/0050080 | A1 | 3/2011 | Suzuki et al. |
| 2012/0000627 | A1 * | 1/2012 | Jewell-Larsen et al. ........ 165/96 |
| 2012/0304637 | A1 | 12/2012 | Allen et al. |
| 2013/0008315 | A1 | 1/2013 | White et al. |
| 2013/0015257 | A1 | 1/2013 | Kalra et al. |
| 2013/0285379 | A1 * | 10/2013 | Seeley et al. .................... 290/52 |
| 2013/0313942 | A1 | 11/2013 | White et al. |

FOREIGN PATENT DOCUMENTS

| | | |
|---|---|---|
| DE | 10360876 A | 9/2005 |
| GB | 0909232 | 7/2009 |
| WO | 2009094441 A | 7/2009 |
| WO | 2010127178 A | 11/2010 |

OTHER PUBLICATIONS

D. Djairam et al. "The Development of an Electrostatic Wind Energy Converter (EWICON)" 2005 International Conference on Future Power Systems High Voltage Technol. & Manage. Group, Delft Univ. of Technol. Dec. 2005; DOI: 10.1109/FPS.2005.204208 ISBN: 90-78205-02-4.

* cited by examiner

__US 9,194,368 B2__

SYSTEM AND METHOD FOR CONTROLLING ELECTRIC FIELDS IN ELECTRO-HYDRODYNAMIC APPLICATIONS

CROSS-REFERENCE TO RELATED APPLICATIONS

This application claims the benefit of U.S. Provisional Application No. 61/394,298, filed 18 Oct. 2010, titled "A System And Method For Controlling Electric Fields In Electro-Hydrodynamic Applications" and U.S. Provisional Application No. 61/528,440 filed 29 Aug. 2011, titled "A System And Method For Controlling Electric Fields In Electro-Hydrodynamic Applications," which are incorporated in their entirety by this reference.

This application is related to prior application Ser. No. 12/357,862, filed 22 Jan. 2009, titled "Electro-Hydrodynamic Wind Energy System" and prior PCT application number PCT/US09/31682, filed 22 Jan. 2009, titled "Electro-Hydrodynamic Wind Energy System" which are incorporated in their entirety by this reference.

STATEMENT OF FEDERALLY SPONSORED RESEARCH AND DEVELOPMENT

This invention was made with government support under HR0011-09-C-0144 awarded by the Department of Defense/Defense Advanced Research Projects Agency. The government has certain rights in the invention.

TECHNICAL FIELD

This invention relates generally to the electro-hydrodynamic wind energy conversion field, and more specifically to a new and useful system and method in the electro-hydrodynamic wind energy conversion field.

BACKGROUND

Electro-hydrodynamic ("EHD") wind energy conversion is a process wherein electrical energy is extracted directly from wind energy. An EHD system is typically a solid-state device that uses wind energy to act against an electrostatic field, separating charged elements from a charged source. In concept, this system can convert wind kinetic energy to electrical potential energy in the form of charges collected at very high voltages.

Past investigations into this field, however, have been fraught with many problems that rendered the energy collection insufficient when compared to the energy input for operating the EHD system. In particular, as an EHD system collects charge from the separation of the charged particles, the system creates an electric field (also called a system field 120) that opposes the motion of the charges. The system field may cancel and even overwhelm the electric field used to charge the particles in the EHD system. As a result, the charge supplied to a charged element (e.g., droplets in a charged liquid spray) is reduced due to the interference of the system field with the charging field. This lowers the working current and power output of the entire system. Additionally, the charged particles that are emitted to the wind stream encounter a very large opposing electrostatic force (also called a space charge 122, shown in FIG. 1), created by the cloud of previously released charged particles downwind from the injector exit, which promotes shorting of the droplets to the charging elements or other components rather than entrainment in the wind stream where the charged particle can contribute to energy harvesting as shown in FIG. 2. Thus, there is a need in the electro-hydrodynamic wind energy conversion field to create new and useful systems and methods for controlling magnitude and direction of the electric field in electro-hydrodynamic applications. This invention provides such a new and useful system and method.

DESCRIPTION OF THE PREFERRED EMBODIMENTS

The following description of the preferred embodiments of the invention is not intended to limit the invention to these preferred embodiments, but rather to enable any person skilled in the art to make and use this invention.

1. System for Field Shaping in EHD Applications

Figure 1:
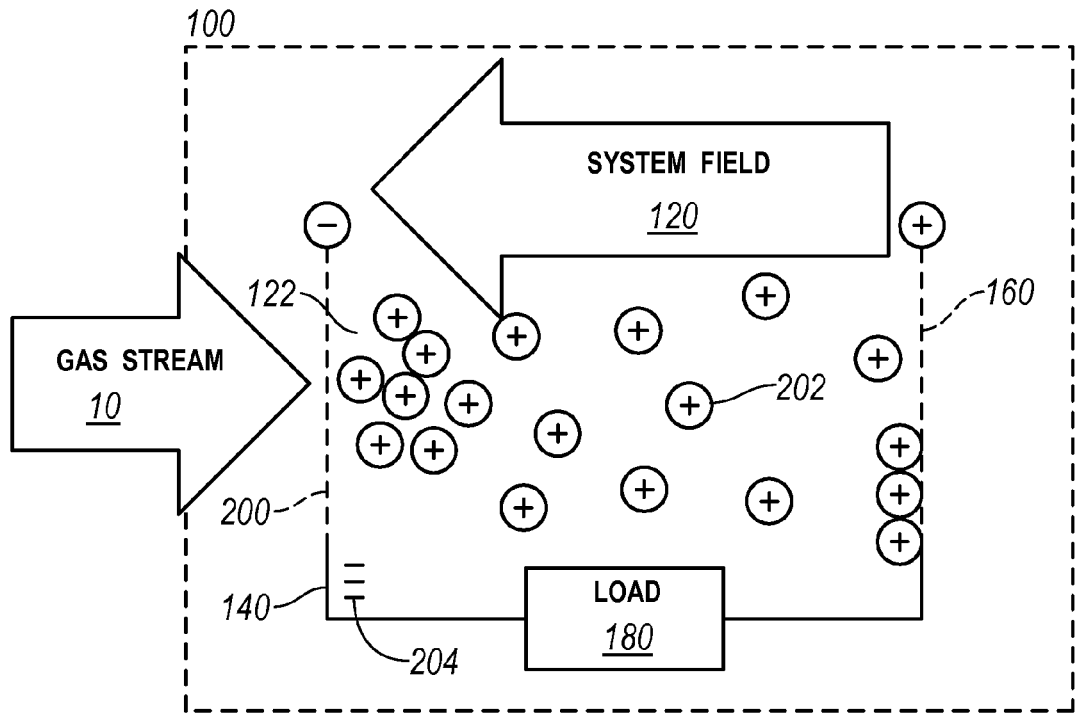
FIG. 1 is a schematic representation of a prior art electro-hydrodynamic energy extraction system with a space charge.
Figure 2:
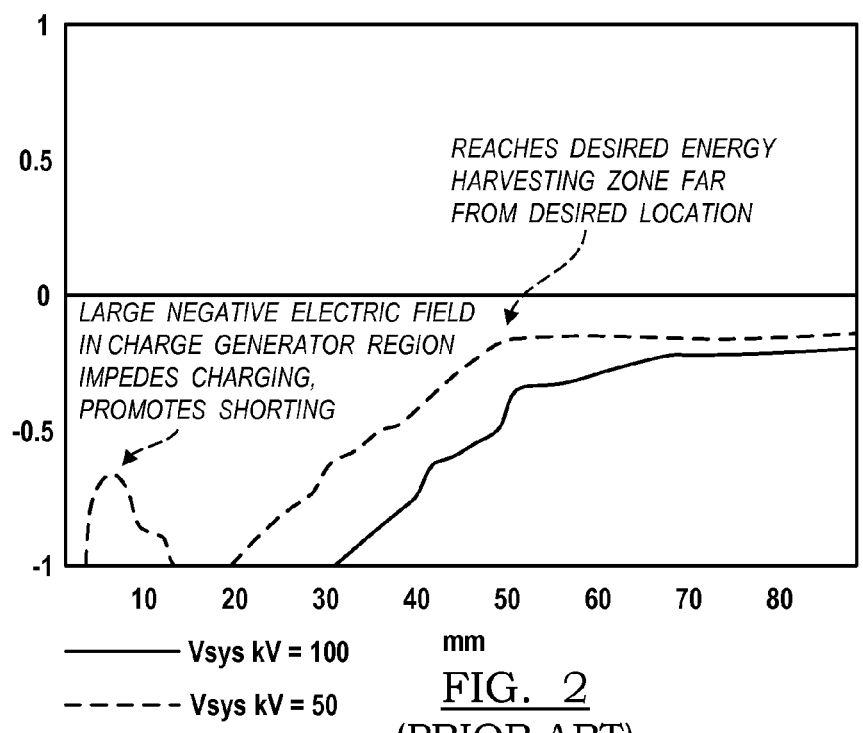
FIG. 2 is graph of prior art indicating unsatisfactory electrical field characteristics.
Figure 3A:
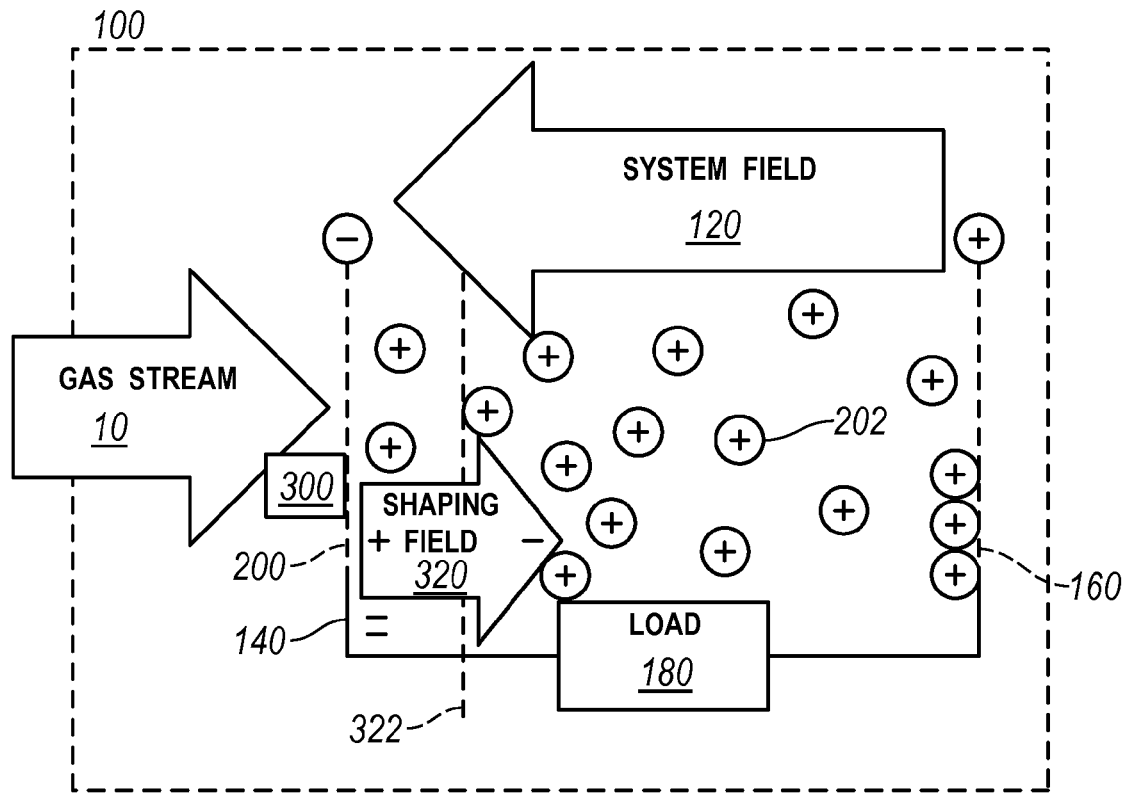
FIGS. 3A and 3B are a schematic representation of a preferred embodiment of the invention and a schematic representation of the electrical fields of a preferred embodiment of the invention, respectively.
Figure 3B:
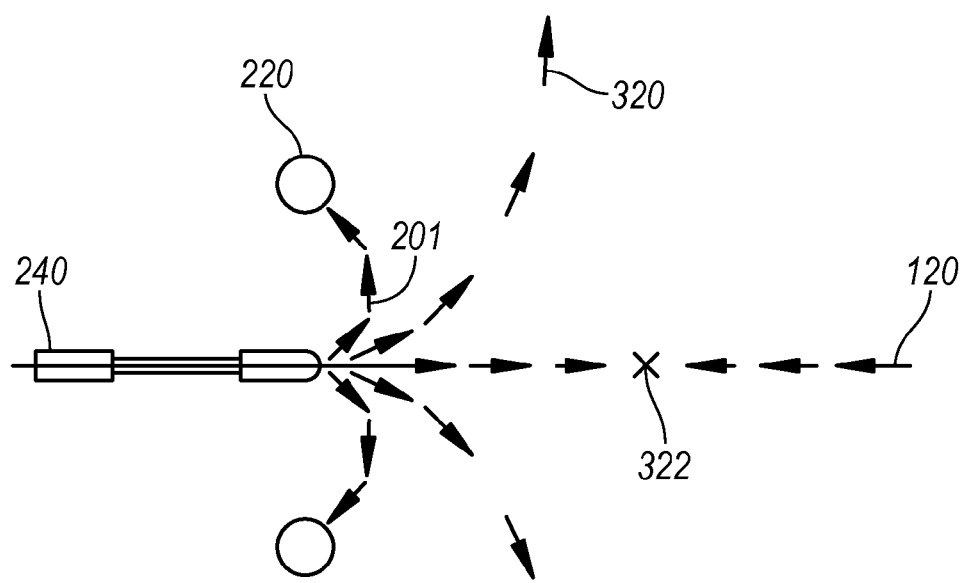
Figure 4:
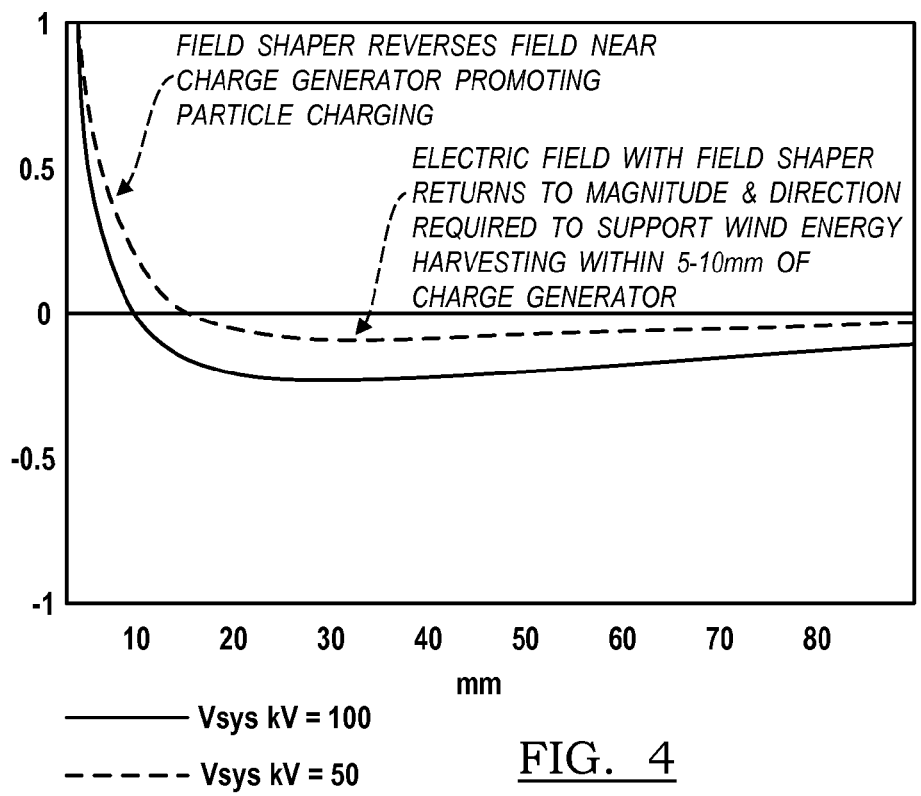
FIG. 4 is an exemplary graph of electrical field characteristics of a preferred embodiment of the invention.
Figure 5:
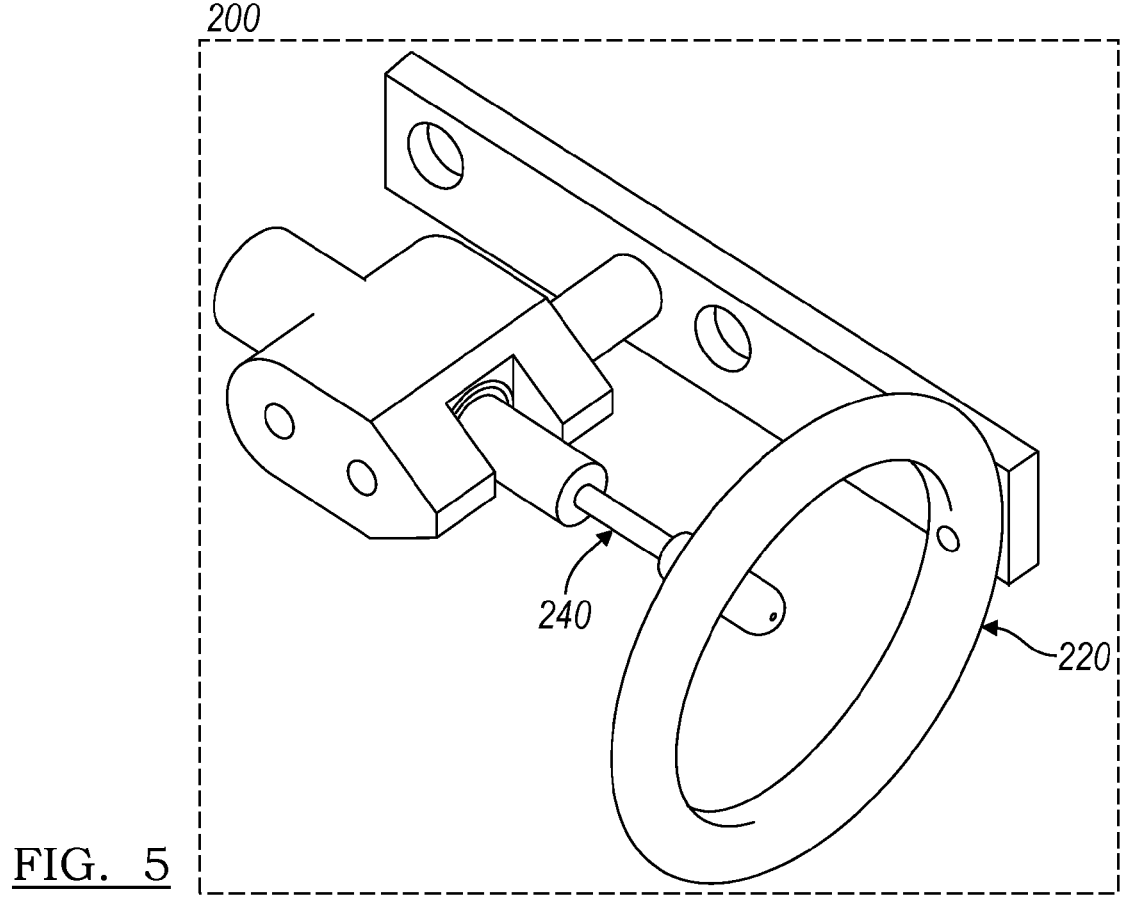
FIG. 5 is a schematic representation of an injector of a preferred embodiment of the invention.
Figure 6:
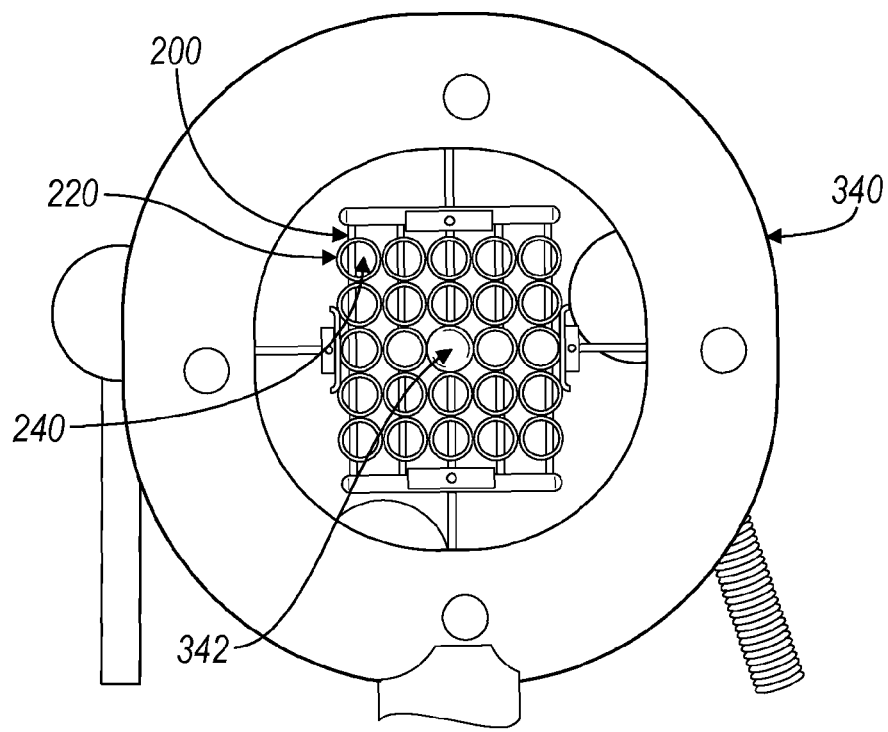
FIG. 6 is a schematic representation of a first embodiment of the invention.

As shown in FIG. 3, a system 100 for controlling electric fields (i.e., field shaping) in an electro-hydrodynamic (EHD) application of a preferred embodiment includes an injector 200 and an electric field generator 300. The injector 200 (or "charge generator") preferably includes at least one electrode 220 and a nozzle 240, and more preferably an array of electrodes 220 and nozzles 240 as shown in FIG. 6. As shown in FIG. 3B, the electric field generator 300 generates an electric field (shaping field 320) that opposes the system field 120 (i.e., has the same field direction as the charging field 201). The shaping field preferably reverses the electric field near the injector, and causes the net electric field to fall to substantially zero at a predetermined point downstream from the injector (minimum field point). The system functions to diffuse the space charge 122, resulting from a cloud of charged particles localized about the injector 200, by reversing the electric field in the immediate vicinity of the injector 200 (e.g., spray nozzle). As shown in FIG. 4, by maintaining an electrostatic field near the injector 200 with the same field direction as the charging field, the field shaping system has the effect of reducing interference with the charging process as well as controlling and optimizing the charge induced on the particles. Furthermore, by maintaining a minimum field point downstream from the injector 200, the shaping field of the electric field generator 300 minimizes the shorting losses by attracting the charged particles away from the injector over a short distance and promoting entrainment in a gas stream 10 (e.g., wind stream). For example, when generating positively charged particles, the electric field generator will preferably maintain a positive field at the tip of a nozzle 240 even when the system voltage drops below ground. The system will preferably maintain field magnitude and direction (i.e., field shape) during normal operation conditions of an EHD system. The field reversal of the electric field generator is preferably highly localized (preferably about the injector), such that the wind may still do work against the system field 120 downwind from the field reversal. Furthermore, the direction of the field reversal changes to oppose the droplet motion at a predetermined distance downstream from the spray source to support energy extraction under the prevailing conditions. Depending on the design of the electric field generator 300 and injector 200 (e.g., nozzle type and particle type), the field reversal induced by the electric field generator may have other shape characteristics. The system ultimately functions to increase the amount of energy that can be harvested from an EHD system. While the preferred system is for wind energy harvesting with an EHD system, the system may alternatively be adapted for other suitable EHD applications such as charge suppression in the presence of multiple charged sprays in the field of agricultural spraying or industrial painting. As shown in FIG. 3, the system preferably additionally includes an upstream collector 140, a downstream collector 160, and a load 180. The upstream collector 140, positioned near the injector 200, collects a particle 204 of opposite charge (polarity) to the particle released into the gas stream. The downstream collector 160, positioned downstream from the injector, collects the particle released into the gas stream. The load 180, electrically coupled between the upstream and downstream collectors, facilitates charged particle flow between the two collectors (i.e. current flow), and transforms the current flow into electric power. The upstream collector is preferably a portion of the injector, but may alternatively be any suitable collector. The downstream collector is preferably a conductive mesh, but may alternatively be the ground (e.g. earth), or any suitable collector. The load is preferably a resistive load, more preferably an adjustable resistive load, but may be any suitable load. The parameters of the load and upstream and downstream collectors (resistance, separation distance, angular orientation, orientation relative to the wind, voltage, etc.) are preferably adjustable and controlled by a processor (e.g. a CPU, a computer control system, etc,) to promote energy extraction from the prevailing conditions.

The injector 200 of the preferred embodiment functions to impart charge on a particle and to introduce the charged particle 202 into the electric field. The charged particle is preferably suitable for entrainment within a fluid stream, more preferably a wind stream, such that energy may be harvested from the work done on the particle by the moving fluid. The particle is preferably a water droplet but may be any suitable particle as described below. The injector preferably injects charged particles into the field. The injector is preferably arranged substantially parallel to the gas stream, but may alternatively be oriented perpendicular to the gas stream (e.g. vertically, horizontally, etc.) at an angle to the gas stream, or in any suitable orientation. The injector 200 is preferably an electrospray injector, but may be a hydrostatic injector, a dry needle (e.g. that injects a substantially dry, charged particle into the wind), a corona charger, or any suitable injector. The injector 200 preferably includes an electrode 220 and a nozzle 240 as shown in FIG. 5, wherein the electrode 220 charges the particles emitted from the nozzle 240. More preferably, the injector 200 includes a plurality of electrodes 220 and nozzles 240. The injectors in one embodiment are preferably substantially similar to the injectors described in prior application Ser. No. 12/357,862, filed 22 Jan. 2009, titled “ELECTRO-HYDRODYNAMIC WIND ENERGY SYSTEM” and prior PCT application number PCT/US09/31682, filed 22 Jan. 2009, titled “ELECTRO-HYDRODYNAMIC WIND ENERGY SYSTEM” which are incorporated in their entirety by this reference. The injector 200 may alternatively be any suitable device and/or process that locally induces charge on a particle or spray.

The electrodes 220 of the preferred embodiment function to maintain a high field concentration at a particle entrance (e.g., a nozzle tip or nozzle exit) to charge the particles. The particles are preferably water droplets that are inductively positively charged. The electrode 220 is preferably a rail electrode or a ring electrode (i.e., induction ring) made of conductive material. A ring electrode 220 preferably circumscribes the nozzle, and is preferably aligned with the ring axis concentric with the axis of the nozzle 240, with the planar position variable before, co-planar, or aft of the tip of the nozzle 240. The ring electrode 220 preferably maintains a higher field concentration at a point closer to the nozzle than to the electrode, wherein the high field concentration preferably has a rapid drop-off of field (volts/meter) heading radially outward towards the ring electrode from the central axis of the ring electrode. This preferably facilitates high field strengths for charging of particles (e.g., electrospray) without providing a current path for short-circuiting. Use of a large diameter (e.g., ⅛-¼ inch) cross-section wire or rod to form the ring electrode 220 preferably improves the shape of the electric field lines such that charging occurs, but short circuiting is reduced. The electrode 220 may additionally be aerodynamically shaped. For example, the cross section may have an airfoil shape. A large diameter ring electrode additionally preferably provides sufficient space between a nozzle and the electrode 220, creating a large area for wind to carry away charged particles. However, the electrode 220 may alternatively be any other suitable electrode (e.g. a plate electrode) and have any other suitable form factor.

The nozzle 240 of the preferred embodiment functions to produce particles to be charged and entrained within the wind stream. The nozzle preferably emits liquid droplets. The droplets are preferably water droplets but may alternatively be water plus additives (e.g. surfactant, cesium, etc.), a water solution, or any suitable alternative liquid. Alternatively, the nozzle may emit a substantially dry particle, such as a polymer or fertilizer. The nozzle preferably has a nozzle tip on the distal end of the nozzle 240 through which the particle is emitted. A pump system is preferably attached to the nozzle on the proximal end of the nozzle 240. A wide variety of nozzle types may be used due to the reduction in restrictions in spray/droplet requirements due to the field reversal from the electric field generator 300. The nozzle is preferably one of those disclosed in PCT application number PCT/US09/31682, but may alternatively be any suitable nozzle for particle emission and charging. As an alternative to the nozzle 240, air, particulate matter, or other non-liquid particles may alternatively be introduced for charging.

Additionally or alternatively, a preferred embodiment may have a plurality of injectors 200 within the field of the electric field generator 300. The injectors 200 are preferably arranged in an array, but may alternatively be arranged in one or more rows, columns, rings, or any other suitable configuration. The field of the electric field generator 300 is preferably useable by any suitable number of injectors. The array of injectors 200 are preferably aligned along a plane, preferably within the space within the electric field generator 300, but alternatively in a space upstream or downstream from the electric field generator 300. The number of injectors is preferably dependent on the properties of the electric field generator 300. In one example, 8-12 injectors are co-planarly arranged within the field of the electric field generator.

The electric field generator 300 (field shaper) of the preferred embodiment functions to manage the properties of the electric field (magnitude and direction) in the region substantially near the injector. More specifically, the electric field generator 300 functions to generate a shaping field 320 that reverses the system field 120 in a localized space near the injector. The net electric field at the tip of a nozzle 240 (or at another satisfactory portion of the injector 200) is preferably held at the maximum electric potential of the charging field (e.g. significantly positive or negative). The magnitude of the net electric field preferably precipitously drops from this maximum at the tip of the nozzle 240 to zero at a point downstream from the injector (zero field point 322). This zero field point is preferably 5 to 10 millimeters displaced from the tip of the nozzle 240 in the direction of the wind stream. The zero field point may alternatively be displaced a greater length, such as 20-50 millimeters or any suitable distance. Thus, the net electric field preferably transitions from a charging field at the nozzle tip to pulling the particles at a point downstream from the injector 200. This functions to prevent shorting of the particles. Beyond the zero field point, the net electric field then preferably opposes particle motion along the Z-axis (i.e., in the direction of the wind stream). Energy can then be harvested from the wind stream overcoming the opposing electric field force on the charged particle. The net electric field at the zero field point 322 is preferably approximately zero, but may alternatively be slightly negative or slightly positive. The electric field generator 300 (also known as a field shield or field shaper) is preferably a conductive element (e.g. a guard electrode) charged to create an electrostatic field with constant shape during normal operating conditions. However, the electric field generator 300 may be an electromagnetic generator, such as a magnetic element (e.g. permanent magnet or electromagnet), or any suitable electric field generator. Additionally/alternatively, the generated electric fields may be dynamic and time-variable instead of static. The electric field generator may be positioned substantially co-planar, downwind, or upwind relative to the injector 200.

In a first embodiment, as shown in FIG. 6, the electric field generator 300 is preferably a circumscribing structure 340 with an open space defined within the center of the electric field generator. The injector 200 is preferably located substantially within this defined open space. The electric field generator is preferably an electrode (e.g. guard electrode), and is preferably made of conductive material, and may be made to be substantially similar to that of the electrode 220, only larger in proportion. The electric field generator is preferably aligned with the axis of the open space to be substantially co-centric and co-planar with the injector 200 (e.g., the electrode 220 and tip of the nozzle 240) as shown in FIG. 6. The electric field generator 340 is preferably a large inductive ring adjacent to the plane of the tips of the nozzle 240. The electric field generator is preferably toroidal in shape, but may be any suitable shape, such as intersecting tubes with rounded ends. The cross sectional diameter of the tubes or ring is preferably substantially larger than those of the electrodes 220. The space defined within the electric field generator 340 is preferably large enough for an injector 200 and may additionally be large enough for a plurality of injectors 200 arranged in an array as described below. In one variation, the electric field generator 300 forms a structural component of the system. For example, the electric field generator 300 may additionally function as a frame coupling the components of the system. As another example, the electric field generator may be used as a conduit or enclosure for fluid lines, electrical input/return, connectors, or any suitable portions of the system EHD system. The lines are preferably channeled through a cavity on the inside of the electric field generator and are properly insulated.

The system of the first embodiment may additionally include at least one field leveler 342 that functions to homogenize (i.e., normalize or make uniform) the field of the electric field generator. The field leveler 342 is preferably a conductive component that augments the field of the electric field generator 340. The field leveler 342 is preferably used in combination with an array of injectors 200. For example, a field leveler 342 is preferably positioned within the center of the space defined by the electric field generator 340 as shown in FIG. 6. The injectors 200 towards the center of the array that are farthest from the electric field generator 340 may be less protected than those adjacent to the electric field generator 340. The field leveler 342 is preferably a conductive element with the same voltage as the electric field generator that "levels out" the field such that injectors towards the center are more equally protected. A plurality of field levelers 342 may be used. The field levelers 342 are preferably charged to a voltage significantly lower than the electrodes 220. This preferably enables a larger coverage area than the electric field generator 340 may be capable of providing on its own.

Figure 7:
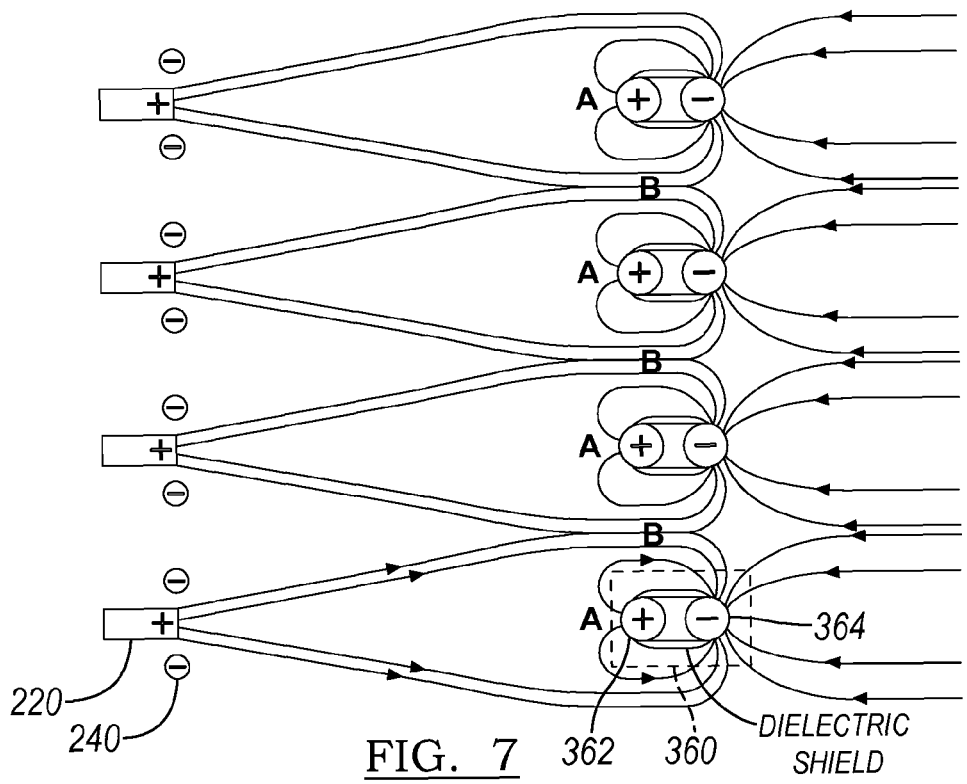
FIG. 7 is a schematic representation of a second embodiment of the invention.
Figure 8:
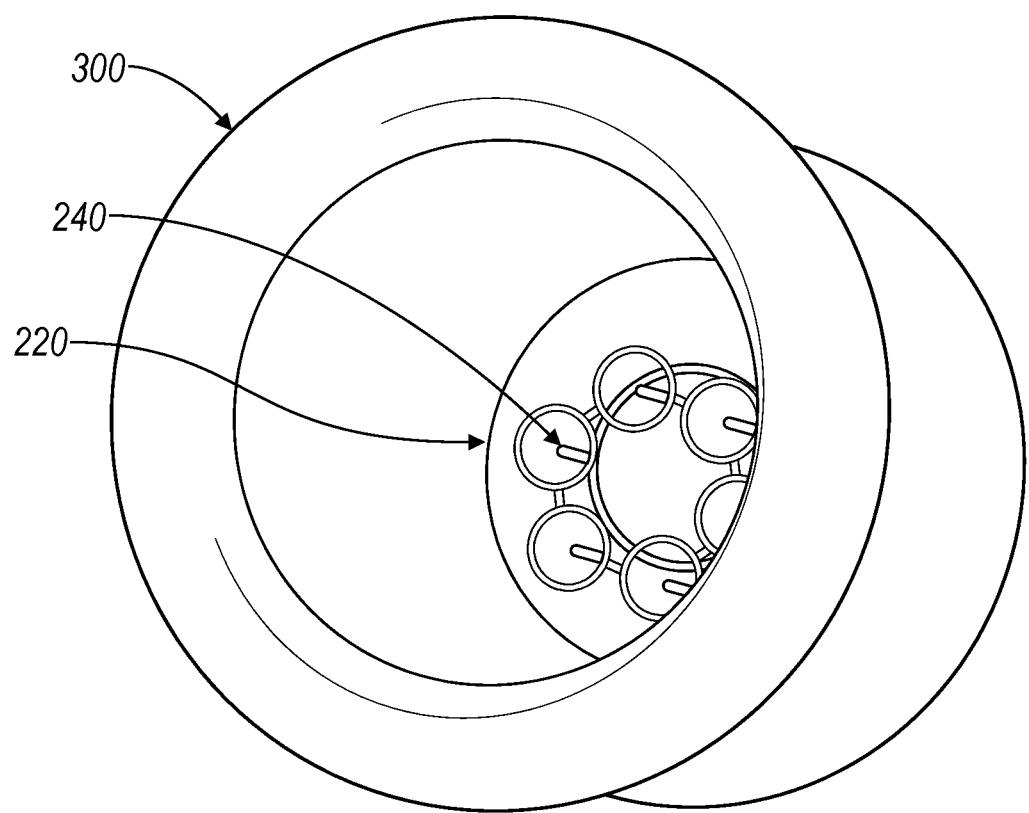
FIG. 8 is a schematic representation of an embodiment of the invention including an aerodynamic electric field generator.

In a second embodiment, as shown in FIG. 7, the electric field generator 360 includes an attracting electrode 364 and a shielding electrode 362 of opposing polarities. A shaping field 320 is created between the attracting-shielding electrode pair, wherein the shaping field 320 interacts with the charging and system fields to create a zero field point 322 substantially near the electric field generator, downwind from the injector 200. The attracting electrode 364 and shielding electrode 362 are preferably closely positioned (preferably coupled by a dielectric couple but alternatively positioned by any other means). The attracting electrode 364 has a polarity opposite that of the charged particles and functions to the charged particles away from the injector 200. The shielding electrode 362 has polarity similar to the charged particles and functions to prevent particle shorting to the attracting electrode by repelling the charged particles away from the attracting electrode. To attract the particles away from the injector, the attracting electrode preferably has a larger electric potential magnitude than the shielding electrode. For example, if positive particles are released, the attracting electrode is preferably more negative than the shielding electrode is positive such that its effect dominates the shaping field 320. The electric field generator 360 is preferably positioned downwind from and near the injector, with the shielding electrode proximal to the injector and the attracting electrode distal from the injector. The electrode pair 360 is preferably aligned substantially against the system field, but may be aligned along the wind stream. However, the electric field generator 360 may have any other position (e.g., fore or co-planar relative to the injector 200), any other orientation (e.g. the shielding electrode may be distal and the attracting electrode proximal to the injector 200), or any other relative electric potential magnitudes (e.g. the shielding electrode may be more positive than the attracting electrode is negative). In one specific embodiment, as shown in FIG. 7, the positively charged particles are attracted to the relatively large negative attracting electrode in the far field (B), but are repelled from shorting to the attracting electrode 364 when the particles enter the near field (A) by the positive shielding electrode 362. Particle momentum (imparted by the gas stream and attraction to the attracting electrode) preferably prevents the particle from shorting to the attracting electrode as the particle flows pas the attracting electrode. The shielding and attracting electrodes are preferably bar electrodes, but may alternatively be point electrodes, a combination thereof, or any suitable type of electrode. Additionally, parameters of the electrode pair (e.g. separation distance between the electrodes, position relative to the injector, electric potentials of the electrodes, etc.) may be dynamically altered to support energy extraction under the prevailing conditions. The system may include any number of electric field generators 360 arranged in any configuration (row, column, array, ring, etc.). In a specific embodiment, the system includes a row of electric field generators 360, aligned in parallel with the injectors within the system field.

Additionally, the electric field generator 300 may be adapted to alter one or more properties of the fluid stream. More preferably, the electric field generator 300 is adapted to have aerodynamic and/or lift-generating properties that focus the wind stream to enhance charged particle radial expansion to further dissipate the space charge. Wind from a wider area, preferably upstream from the injector 200, may be funneled through the electric field generator 300. The electric field generator is preferably formed as an airfoil, but may alternatively be formed as a convergent-divergent nozzle (as shown in FIG. 8), wherein the injector 200 is located in the throat of the nozzle, a convergent nozzle, a divergent nozzle, or have any other suitable aerodynamic form. These aerodynamic properties may additionally be inherent in the ring shape of the electric field generator 300. The depth of the electric field generator 300 may additionally be set to facilitate the extension of the protected field area. An additional device may be coupled to the electric field generator 300 to further widen the area of wind collection. Any suitable device or technique may alternatively be used to facilitate control of aerodynamic properties in the vicinity of the injector(s) 200. The electric field generator 300 may additionally and/or alternatively alter the temperature, humidity, pressure, or any other suitable parameter of the gas stream flowing therethrough.

The electric field generator 300 may be made of modular components such that an electric field generator can be easily constructed. A modular design could even be designed for connecting an array of electric field generators. The electric field generator 300 preferably is rounded or has rounded edges. Sharp edged hardware such as nuts and fasteners are preferably protected, and common corona reduction practices are preferably followed. The electric field generator may alternatively come in any suitable shape or form. The electric field generator is preferably electrically insulated to prevent shorting, and is preferably encapsulated by a solid dielectric material, but may alternatively be encapsulated by a liquid dielectric material, glass, ceramic, or a composite polymer.

The electric field generator 300 is preferably powered to generate the electrostatic field of the electric field generator 300. With the addition of the electric field generator, the electrodes 220 of the injector 200 can preferably be operated at a lower voltage, which functions to increase efficiency. Lowering the voltage even further below that of the electrode (s) 220 may further lower the induction charging voltage and enhance the efficiency of the system. Additionally, the electric field generator 300 may be charged by a power source separate from the ring electrode(s) 220. With a separate power supply, the electric field generator 300 preferably draws power during startup and preferably maintains the field with no or little power loss since there is preferably no current flowing in the circuit of the electric field generator 300. This is comparable to charging a capacitor and holding the voltage constant. Small amounts of positive entrained charge may short back to the electric field generator 300. The aerodynamic design of the electric field generator may reduce such occurrences.

In a first preferred embodiment, as shown in FIG. 6, the system includes an injector, an upstream collector, a downstream collector, a load coupled between the upstream collector and the downstream collector, and an electric field generator. The injector is an array of electrospray injectors, each including a ring electrode circumscribing a nozzle that emits a plurality of positively charged particles into the gas stream. The injector also functions as an upstream collector that collects the negatively charged particles orphaned by the released particles. The downstream collector collects the positive particles at a point downstream from the injector. A first electric field (system field) that opposes particle movement with the gas stream is created in the space between the upstream collector and the downstream collector, wherein the gas stream does work on the particle against the system field as the stream moves the particle from the injector to the downstream collector (e.g. drag on the particle by the gas stream at least partially opposes drag on the particle by the electric field). The load, coupled between the upstream collector and the downstream collector, functions to convert the kinetic energy of the gas stream into power by facilitating charge flow (i.e. current flow) between the two collectors. The electric field generator is an inductive electrode (e.g. ring electrode) circumscribing and substantially co-planar with the injectors. The electric field generator creates a second electric field (shaping field) opposing the first, such that the net electric field is a falling positive field, adjacent to the injector, which draws the positive particles away from the injector. At a zero field plane downstream from the injector, the net electric field transitions to a rising positive field that opposes particle movement with the gas stream. The electric field generator may additionally include a field leveler, positioned concentric and coplanar with the electric field generator (preferably substantially in the middle of the injectors), that is held at the same polarity as the electric field generator, that adjusts the net electric field to be substantially homogeneous (in magnitude and direction) across the injector.

In a second preferred embodiment, the system includes substantially the same components as the first embodiment, except that the electric field generator includes a plurality of shielding and attracting electrode pairs 360, located downstream from the injector, in addition to the circumscribing inductive electrode. The electrode pairs are encapsulated within an airfoil made of dielectric material. Each shielding electrode is held at substantially the same low positive potential, and each attracting electrode at substantially the same high negative potential (relative to the shielding electrodes). The magnitudes of the electric fields created between the shielding electrode and the attracting electrode (shaping field) are preferably substantially smaller than the magnitude of the system field. The shielding and attracting electrode pairs 360 are positioned within the system field (downstream from the injector), substantially near the injector, with the shielding electrode aligned proximal the injector and the attracting electrode distal the injector. Each shielding and attracting electrode pair is substantially aligned along the gas stream, and moves as the gas stream changes direction.

In a third preferred embodiment, the system includes substantially the same components as the second embodiment, except that the electric field generator only includes the plurality of shielding and attracting electrode pairs 360, and does not include a circumscribing inductive electrode.

As a person skilled in the art will recognize from the previous detailed description and from the figures and claims, modifications and changes can be made to the preferred embodiments of the invention without departing from the scope of this invention defined in the following claims.

We claim:

1. An electro-hydrodynamic system that extracts energy from a gas stream, the system including:
an injector that injects a first species of particles from an injector exit having the same polarity into the gas stream wherein particle movement with the gas stream is opposed by a first electric field;
an electric field generator that generates a second electric field opposing the first, such that the net electric field at a predetermined distance downstream from the injector is zero wherein the electric field generator is toroidal, at least partially encircles the injector, is and substantially concentric with the injector, and wherein a portion of the electric field generator is positioned upstream from the injector exit;
an upstream collector that collects a second species of particles having a polarity opposite the first particle species;
a downstream collector that collects the charged particle; and
a load coupled between the downstream collector and the upstream collector, wherein the load converts the kinetic energy of the gas stream into electric power.

2. The system of claim 1, wherein the electric field generator is an electrode.

3. The system of claim 1, wherein the electric field generator further includes a field shaper that shapes the second electric field.

4. The system of claim 3, wherein the field shaper is an electrode positioned substantially coplanar with and along the center axis of the electric field generator.

5. The system of claim 1, wherein the electric field generator is positioned downstream from the injector.

6. The system of claim 5, wherein the electric field generator attracts the first species of particles.

7. The system of claim 6, wherein the electric field generator includes a first electrode held at the same polarity as the first particle species and a second electrode held at a polarity opposite that of the first particle species, wherein the first electrode is aligned with the second electrode substantially along the gas stream, wherein first electrode is proximal to the injector, and the second electrode is distal to the injector.

8. The system of claim 7, wherein the magnitude of the electric potential of the first electrode is smaller than that of the second electrode.

9. The system of claim 1, wherein the predetermined distance is 5-10 mm downstream from the injector.

10. The system of claim 1, wherein the particles are liquid droplets.

11. The system of claim 1, wherein the injector includes a plurality of nozzles that inject the first species of particles into the gas stream.

12. An electro-hydrodynamic system that extracts energy from a gas stream, the system including:
an injector that injects a first species of particles having the same polarity into the gas stream, wherein particle movement with the gas stream is opposed by a first electric field;
an electric field generator, comprising a toroidal electrode substantially concentric and coplanar with the injector, that generates a second electric field opposing the first, wherein the second electric field reverses the net electric field a predetermined distance downstream from the injector, the second electric field having a higher strength at a point distal from the electric field generator than a point proximal to the electric field generator, wherein a portion of the electric field generator is positioned upstream from the injector;
an upstream collector that collects a second species of particles having a polarity opposite the first particle species;
a downstream collector that collects the charged particle; and
a load coupled between the downstream collector and the upstream collector, wherein the load converts the kinetic energy of the gas stream into electric power.

13. The system of claim 12, wherein the electric field generator alters the velocity of a portion of the gas stream.

14. The system of claim 13, wherein the electric field generator includes a convergent nozzle, wherein the injector is positioned substantially in the throat of the nozzle.

15. An electro-hydrodynamic system that extracts energy from a gas stream, the system including:
an injector that injects a first species of particles having the same polarity into the gas stream, wherein particle movement with the gas stream is opposed by a first electric field;
a toroidal electrode, coplanar and concentric with the injector, that generates a second electric field opposing the first, such that the net electric field at a predetermined distance downstream from the injector is approximately zero;
an upstream collector that collects a second species of particles having a polarity opposite the first particle species;
a downstream collector that collects the charged particle; and
a load coupled between the downstream collector and the upstream collector, wherein the load converts the kinetic energy of the gas stream into electric power.

* * * * *